Nov. 28, 1961     K. B. MELDRUM ET AL     3,010,311

APPARATUS FOR TEST STRESSING MATERIALS

Filed Aug. 6, 1959

INVENTORS
KENNETH B. MELDRUM
JOHN R. HENTHORN
CLAIRE A. EVERSON

BY

ATTORNEY

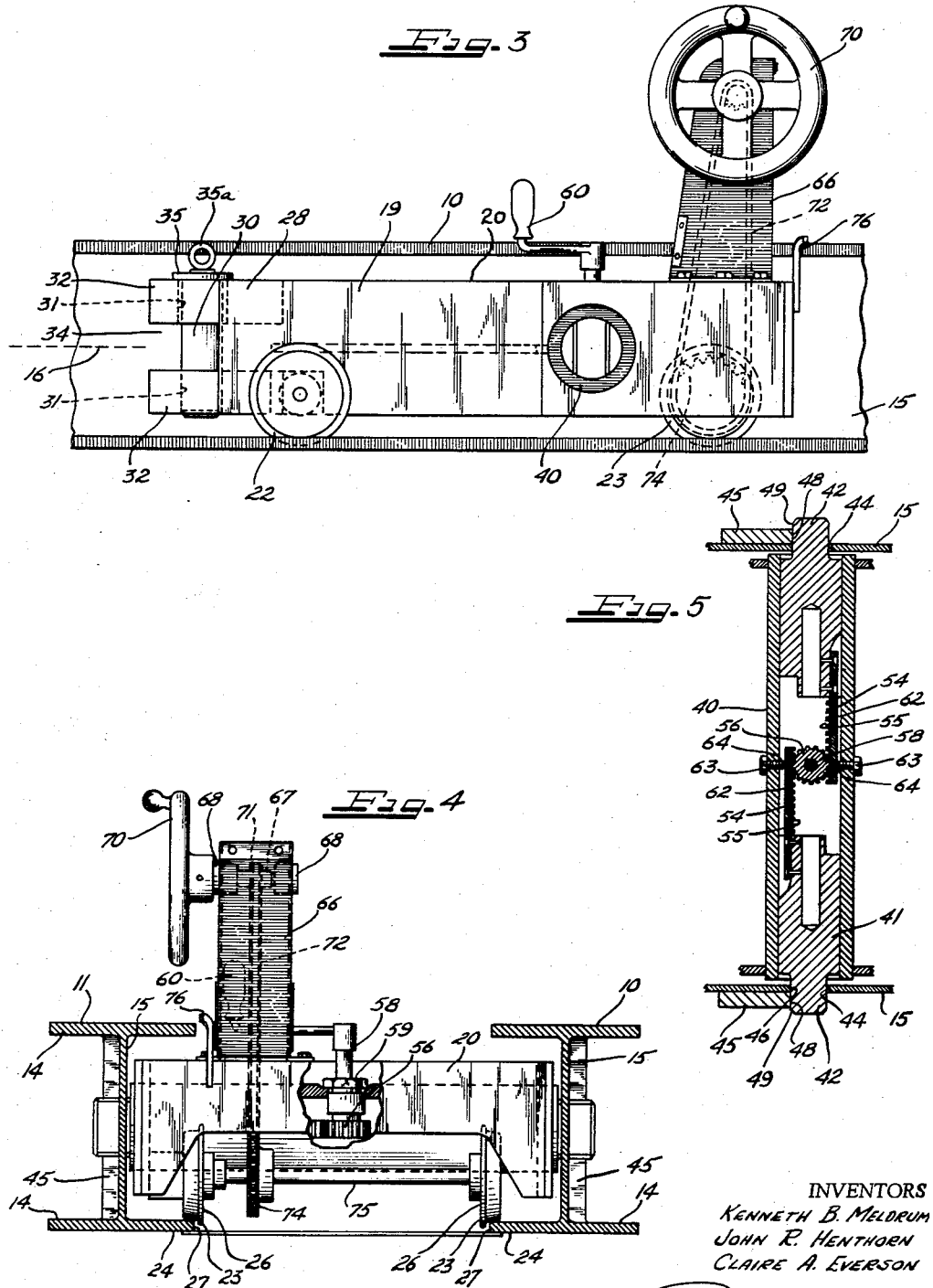

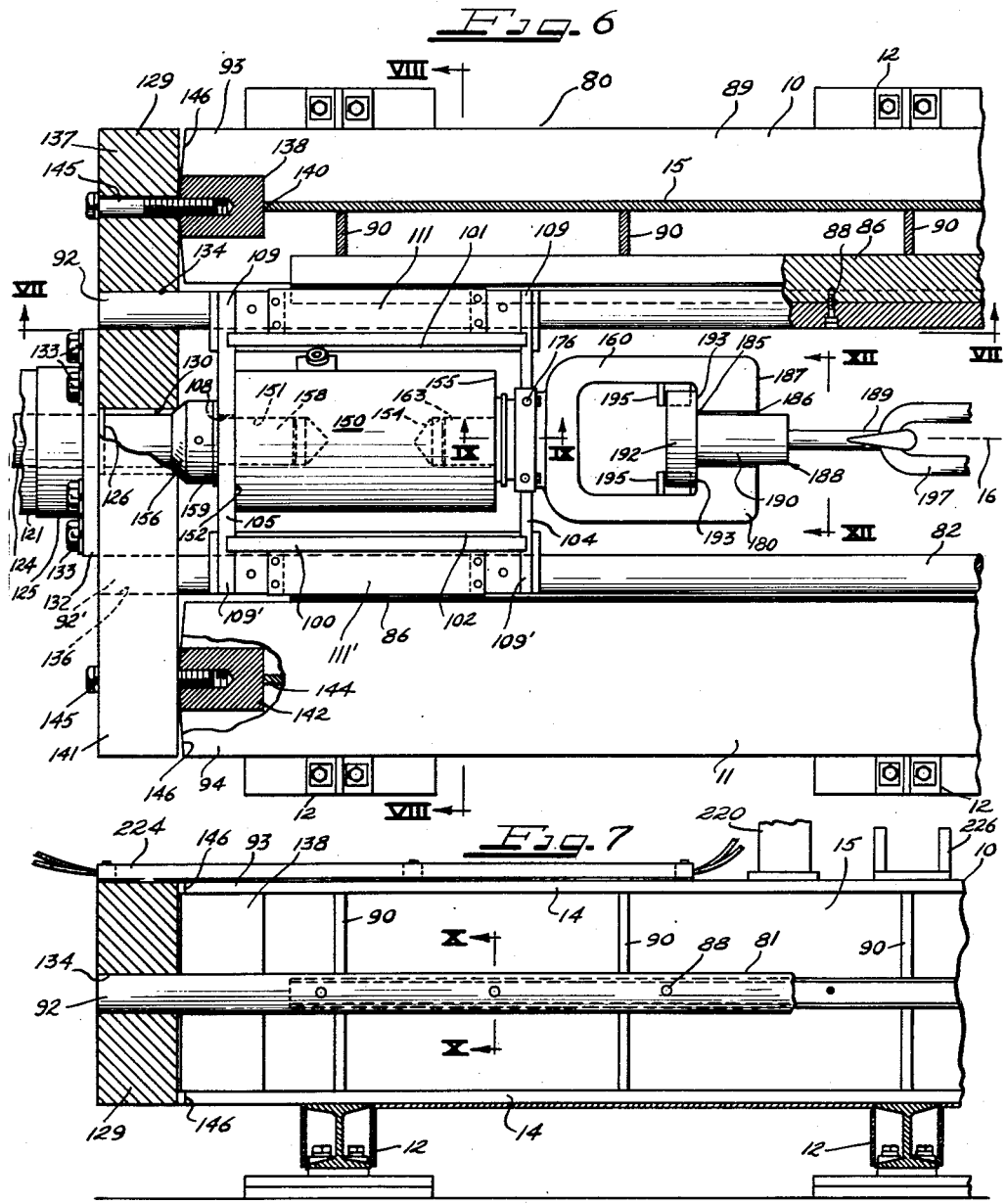

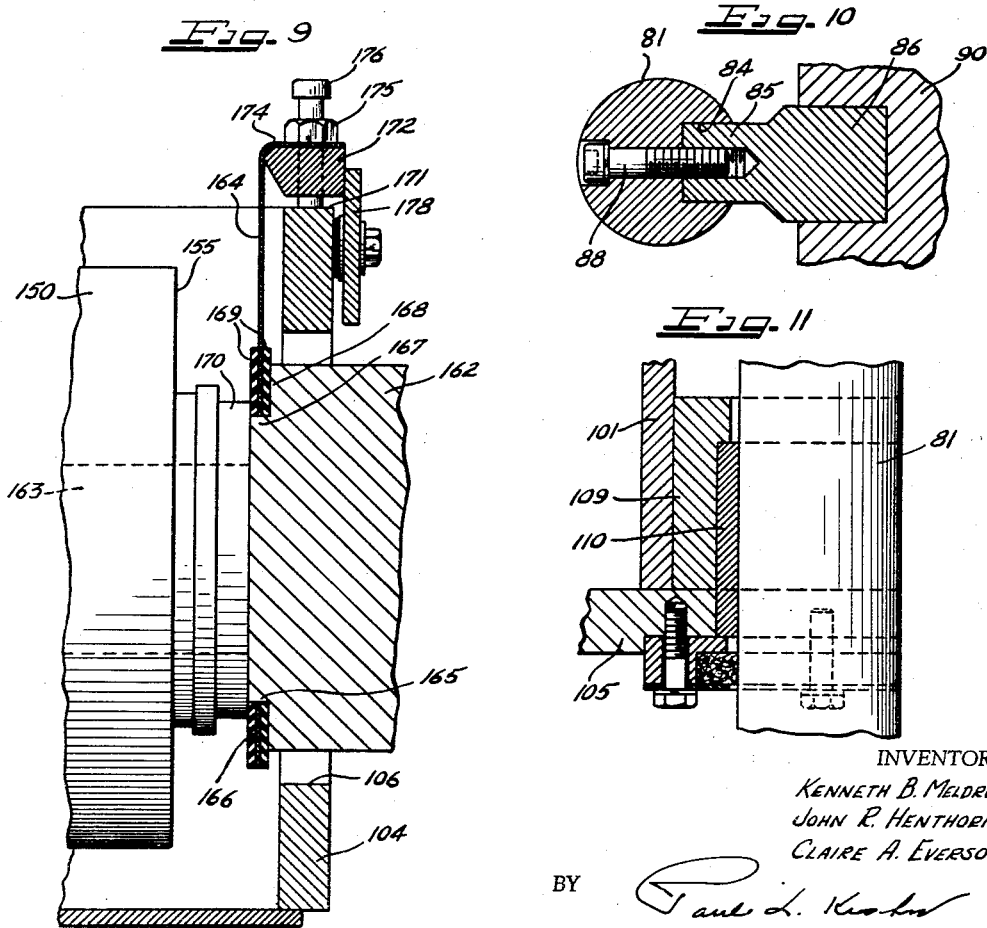

United States Patent Office 3,010,311
Patented Nov. 28, 1961

3,010,311
APPARATUS FOR TEST STRESSING
MATERIALS
Kenneth B. Meldrum, Newark, and John R. Henthorn and Claire A. Everson, Beloit, Wis., assignors to Fairbanks, Morse & Co., Chicago, Ill., a corporation of Illinois
Filed Aug. 6, 1959, Ser. No. 832,093
5 Claims. (Cl. 73—95)

This invention relates to improvements in apparatus for test stressing materials, and concerns improved apparatus suitable more particularly for the test stressing of chains, cables, ropes and the like.

An object of the invention is to provide improved apparatus for the purpose indicated, characterized by sturdy construction and accurate relationship of its parts, and by ease of operation and improved test accuracy.

Another object is to provide improved apparatus as aforesaid, having transducer means such as electrical strain gauge load cell means, arranged in the stress applying mechanism as an element thereof, for producing operation of suitable stress indicator and recorder means.

The foregoing and other objects and advantages attending the present invention, will appear readily from the following description of a preferred embodiment of the invention as illustrated by the accompanying drawings, wherein:

FIG. 1 is a view in plan elevation, of the improved apparatus, together with diagrammatic illustrations of fluid pressure supply and control means for the hydraulic motor of the apparatus, and stress indicator and recorder means;

FIG. 2 is a longitudinal side elevation of the apparatus;

FIG. 3 is an enlarged view in side elevation, of a chain mount structure selectively positionable in one end region of the apparatus, the view being taken from line III—III in FIG. 1;

FIG. 4 is an enlarged rear end elevation of the mount structure as shown in connection to the frame of the apparatus, the view being taken from line IV—IV in FIG. 1;

FIG. 5 is an enlarged detail view in section, of frame connecting mechanism of the mount structure;

FIG. 6 is an enlarged fragmentary view in plan at the motor end region of the apparatus (left hand end region in FIG. 1) with parts shown in section, the view illustrating a chain mount including a load cell and carriage therefor;

FIG. 7 is a fragmentary longitudinal sectional elevation taken along line VII—VII in FIG. 6;

FIG. 8 is a transverse sectional view of the apparatus as taken from line VIII—VIII in FIG. 6, the view showing the load cell carriage in rail support;

FIG. 9 is an enlarged fragmentary view in section, showing flexible load cell support on the carriage, this view being taken from line IX—IX in FIG. 6;

FIG. 10 is an enlarged sectional view transversely of a carriage rail and its support, as taken from line X—X in FIG. 7;

FIG. 11 is an enlarged fragmentary sectional view of the load cell carriage in a region of rail support thereof, the view being taken along line XI—XI in FIG. 8;

FIG. 12 is an end elevational view of a bracket and chain support thereon, shown with portions broken away and in section, as taken from line XII—XII in FIG. 6, and FIG. 13 is a view in plan elevation, of a load cell and chain support unit provided as a substitute for the bracket carried chain support shown in FIGS. 6 and 12.

As shown in FIGS. 1 and 2, the base or frame of the presently improved apparatus includes a pair of elongate rigid members 10 and 11 which are arranged horizontally in parallel, spaced-apart positions on suitable spaced floor or ground footings 12. These members are steel beams each preferably of H-form in transverse section, having opposite flanges 14 joined by a central longitudinal beam web 15 (see FIG. 4). Since the beams here carry the entire reaction to the stressing forces in testing of chains, cables, ropes or the like, as will appear more fully hereinafter, the structural dimensions thereof are determined to afford adequate strength under maximum test force application according to the intended capacity of the apparatus. Moreover, the beams are selected as to over-all length, with each provided either as a one-piece member or in two or more connected sections as shown, such as to accommodate for example chain specimens in lengths up to a desired maximum length of the whole or any portion of a given chain to be tested. In beam mounting, the beams are accurately spaced and secured on footings 12 such that they will be in transverse registry with the webs 15 thereof in opposed or facing relation and parallel over the length of the beams, hence equi-distant from the central longitudinal frame axis indicated by the broken line 16 (FIGS. 1, 3 and 6).

It may be noted here that the word "chain" as employed herein and in the accompanying claims, is to be considered as meaning a chain, cable, rope and the like or any member or material of a form or nature suitable for test stressing by the present apparatus.

Located in the region of the frame end portion 18 is a chain mount structure 19 adapted for positionment, selectively, at any one of several stations along the beams 10 and 11, as will appear presently. With reference to FIGS. 1, 3 4 and 5, structure 19 comprises a frame 20 spanning the beams therebetween and having forward and rear flanged wheel sets 22 and 23 riding on the inner opposed margins 24 of the lower beam flanges 14. The wheel sets are relatively spaced in the longitudinal direction of the beams, and have the wheels thereof axially restricted to a relatively small clearance of the wheel flanges 26 relative to the edges 27 of the associated beam flanges, such as to preclude or reduce to a negligible small amount any canting or lateral displacements of the frame 20 relative to the beams. The forward end portion 28 of frame 20 provides a chain support constituted by a coupling pin 30 removably seated in vertically aligned pin apertures 31 in vertically spaced frame members 32, the latter forming a jaw space 34 for reception of one link of a chain to be test stressed, with the coupling pin 30 passing through the opening of the link. It is to be understood, of course, that if preferred and especially in the case of testing small chains, cables, ropes, etc., connection to pin 30 may be made through a hook, ring or other adapter (not shown). Pin 30 has a head flange 35 engageable with the upper one of members 32 to retain the pin in mounted position, the flange preferably having a lifting eye-bolt 35a as shown. In accordance with present improvements, the chain under test is to be in extension between support pin 30 in jaw 34 and a second chain support hereinafter to be described, such that the chain will be disposed along the longitudinal center axis 16 of the frame. Therefore, the members 32 are disposed such as to locate pin 30 with its axis intersecting frame axis 16, and to locate jaw space 34 such that the center of its vertical extent lies in a horizontal plane containing frame axis 16.

Carried by the frame 20 of chain mount 19, is a cylinder 40 (FIGS. 3 and 5) open at its ends and arranged transversely thereon in a position having the cylinder axis normal to the beam webs 15 and intersecting the longitudinal center lines of the webs. Axially slidable in each end portion of the cylinder is a plunger 41 the outer end of which terminates in a projection or pin 42 adapted for reception through any one of a series of apertures 44 (see FIGS. 2 and 5) in the adjacent beam web 15. The apertures 44 in the webs of the opposite beams 10 and 11 are provided in transversely registered pairs, with the pairs suitably spaced-apart longitudinally of the beams over the frame end portion 18 to afford positional stations for the chain mount 19. Associated with the apertures of each pair and rigidly secured to the beam webs, are abutment elements or plates 45 each extending along that vertical margin 46 (FIGS. 2 and 4) of the associated aperture which is on the far side of the aperture from the frame terminal end 47. The plates 45 at each pair of web apertures provide, together with the associated aperture margins 46, planar abutment surfaces 48 (FIGS. 4 and 5) which lie in a common vertical plane transversely of the beam webs 15 and normal to the central longitudinal frame axis 16. Additionally in each pair, the vertical centers of the surfaces 48 lie in a common horizontal plane containing frame axis 16 and the longitudinal center axes of the beam webs 15. With the abutment surfaces 48 thus provided, plunger pins 42 are formed to have corresponding vertical side surfaces 49 of planar form, for full surface engagement with surfaces 48 of a selected pair of web apertures upon extension of the pins through such apertures. It may be noted here that the plungers 41 are suitably restricted against rotation by means presently to appear, thereby to limit plunger movement to the axial direction with the pin side surfaces 49 oriented at all times for full surface contact with abutment surfaces 48 upon projection of the pins in any selected pair of web apertures. The plungers 41 through the pins 42 when engaged in a selected pair of beam web apertures as aforesaid, thus retain the chain mount structure 19 at the station determined by the selected apertures, in force-transmitting connection to the beam webs 15. Hence, in test stressing of a chain, the stress reaction at this end of the chain is transferred through pin 30, mount structure 19 and its cylinder 40, and plungers 41 to the beam webs 15 through plunger pins 42, the stress reaction thereby being taken by the beams 10 and 11 directly along the beam webs with substantially uniform reaction-force distribution about the longitudinal center axes of the beam webs.

While power means such as a fluid pressure servomotor system may be employed to effect extension and retraction of the plungers 41, as to seat and unseat the plunger pins 42 relative to any selected pair of web apertures 44, it is preferred to illustrate manually operated means for this purpose. Within cylinder 40 and suitably connected to the inner end portion of each plunger 41 is a rack bar 54 (FIG. 5), the rack bar being diametrically opposed and having the rack teeth 55 thereof enmeshing a single gear wheel 56. Gear wheel 56 is carried by and keyed to the inner end portion of an operating shaft 58 projecting outwardly and vertically above the cylinder 40, the shaft being journalled in a bearing 59 (FIG. 4) and having a handle 60 fixed to its outer end. Thus, by turning the handle and shaft in one direction, the gear 56 will operate the rack bars to retract the plungers such as to free the plunger pins 42 from seated position in a pair of web apertures, so that the chain mount structure then may be displaced to registry of the pins 42 with another of web apertures. Then, upon reverse turning of the handle and shaft, the gear 56 will operate the rack bars to produce outward plunger displacement to seating of the pins in the selected pair of web apertures. In this way, the chain mount 19 may be readily adjustably positioned along the beams, as requirements may indicate.

As before indicated, provision is made to restrict the plungers 41 against rotation in the cylinder. Such provision is here made conveniently by forming each rack bar 54 to have a planar back side 62 along its length, and mounting in the cylinder wall opposite each rack bar, a suitable adjustable set screw 63 having a flat inner end surface 64 slidably engaged by the back side 62 of the bar. These set screws serve, also, to insure effective engagement of the rack bars with the gear 56.

For effecting movements of the test chain mount structure 19 from one station to another, it is presently preferred to afford a drive means here illustrated as comprising a chain type drive. Carried on frame 20 is a standard 66 (FIGS. 3 and 4) having a shaft 67 rotatably supported in bearings 68 at its upper end. Shaft 67 turnable through manually operated hand wheel 70, has a sprocket 71 fixed thereto and engaged by a drive chain 72. Chain 72 extends vertically in the standard to connection with a sprocket 74 fixed on the axle 75 of the rear set of wheels 23. Thus by turning the hand wheel in either direction, the mount 19 may be driven through its wheels 23 from station to station along the beam members, such movement being permitted, of course, only after retraction of the plunger pins 42 from seating in beam web apertures 44. An indicator or pointer 76 may be suitably secured, as by welding, to the rear end of frame 20 for cooperation with suitable markings (not shown) on the upper flange of the adjacent beam 11, to indicate when the mount 19 is properly located for entrance of the plunger pins 42 in a set of apertures 44.

Located in the opposite end region 80 of the frame afforded by beams 10 and 11, is a second chain mount structure which with chain mount 19, receives and supports the chain test specimen. The second mount is displaceable by power means for test stressing of the chain specimen, and includes transducer means for activating stress indicator provisions, all as now to be described and with particular reference to FIGS. 6 to 11.

A pair of trackway forming rails 81 and 82 are arranged in parallel relation between the beams at the frame end 80, the rails preferably being solid rods of circular section. Rail 81 is formed to provide a longitudinal slot or recess 84 (FIG. 10) for receiving the longitudinal marginal portion 85 of a rail mounting bar 86, to which the rail is secured as by machine screws 88. Bar 86 in turn, is rigidly secured to and parallel with the end section 89 of frame beam 10, as by a plurality of plates 90 in vertical positions between the flanges 14 at the indicated beam end and welded or otherwise secured to the flanges, the beam web 15 and the bar. For a purpose to appear, the end 92 of rail 81 extends outwardly beyond the terminal end 93 of the beam 10. The opposite rail 82 is mounted in like manner to beam 11, as by rail bar 86[1] and support plates 90[1], and has its end 92[1] extending outwardly beyond the terminal end 94 of beam 11. In mounting the rails 81 and 82 by the means described, they are thereby accurately located such that the rails are exactly parallel to each other and with the beams 10 and 11, and such that the longitudinal axes of the rails lie in a common horizontal plane containing the central longitudinal axis 16 of the frame provided by the beams 10 and 11.

Supported on the rails for sliding movement therealong, is a carriage structure 100 comprising a centrally open rectangular frame having opposite side walls 101 and 102, a forward end wall 104 and rear end wall 105. Forward wall 104 has a central opening 106, while the rear wall has a central opening 108 in alignment with opening 106. Suitably secured to the side wall 101 adjacent the frame corners at such side, are bearing brackets 109 (see FIG. 11) each providing a semi-circular recess having a semi-circular sleeve bearing 110 therein adapted to receive and embrace the rail 81. On side wall 102 are like, similarly disposed bearing brackets 109[1] having semi-circular sleeve bearings 110[1] for receiving and embracing rail 82. As shown in FIGS. 6 and 8, a cover 111 may be provided over the two bearing brackets 109, and a like cover 111¹ over the two bearing brackets 109¹. Thus, the carriage is slidably mounted on the rails through the corner bearings. Moreover, these bearings are so disposed relative to the carriage frame as to locate the latter centrally between the rails 81 and 82 in a position to have the centers of end wall openings 106 and 108 substantially coincident with the longitudinal central axis 16 of the apparatus frame, the carriage end walls 104 and 105 for this purpose, each being in a vertical plane normal to the rails. The carriage 100 is provided as a mount for transducer and chain support elements, but before describing these, it is preferred to refer to and describe at this point the motor means as provided for operative association with the carriage and its elements.

In the present exemplary embodiment and with reference to FIGS. 1, 2, 6 and 7, the source of chain stressing force is provided by a hydraulic piston motor 120 operated by suitable fluid as oil under pressure. The motor comprises an elongate cylinder 121 having a piston therein (not shown) on the inner end of a piston rod 124, the piston and rod being movable rectilinearly along the cylinder axis, with the piston rod projecting from the forward cylinder head 125 through a packing gland assembly indicated at 126. The motor 120, selected to have adequate capacity for chain stressing up to the maximum stress force for which the apparatus is intended, is arranged in extension at the end 80 of the apparatus frame, as shown. It is mounted by a pedestal 128 at its rear end and a frame attached mounting member 129 at the cylinder head 125, in a position to have the axis of the piston rod 124 in line with the central frame axis 16. The mounting member 129 is centrally apertured at 130 to accommodate piston rod 124 therethrough and to receive packing gland 126, and is secured to cylinder head flange 132 as by bolts 133. To facilitate attaining the aforesaid position of the motor, member 129 is provided with an indexing aperture 134 at one side of central aperture 130 and a like indexing aperture 136 at the other side of aperture 130, these indexing apertures having their center axes intersecting the longitudinal center line of member 129 (which center line intersects the center axis of aperture 130). Further, the indexing apertures are equally spaced from the center axis of aperture 130 by a predetermined distance, so that in mounting the member against the terminal ends 93 and 94 of the respective beams 10 and 11, the projecting end 92 of rail 81 will seat closely in index aperture 134, while the projecting end 92¹ of rail 82 will seat closely in index aperture 136. These rail ends in the index apertures of member 129 thus aid the placing of member 129 in a position normal to the rails and, hence, to the frame beams 10 and 11, with the piston rod 124 centered on the frame center axis 16.

With further reference to motor mounting member 129, in its assembled position the end 137 of the member engages an abutment element or block 138 which is recessed in the terminal end 93 of beam 10 and secured to the beam in contact with the terminal edge 140 of the beam web 15. In like manner, the opposite end 141 of member 129 engages an abutment element or block 142 recessed in terminal end 94 of beam 11, the block being secured to the beam in contact with its web 15 at the terminal end 144 of the latter. As shown, member 129 is secured to the blocks 138 and 142 by machine screws 145.

It will be appreciated from the foregoing description respecting the present provisions mounting the hydraulic motor 120 on the frame beams 10 and 11, that the stress reaction of the motor in its chain stressing function (the motor piston rod 124 having operative connection with the chain under test, by means hereinafter described), will be concentrated in the mounting member 129 and transferred thereby through bearing blocks 138 and 142 to the webs 15 of the frame beams 10 and 11. In the present example the width of member 129 corresponds to the over-all depth of the frame beams, so that it overlaps the ends 146 of the upper and lower flanges 14 of each beam. Therefore, in order to assure concentration of reaction stress transmission from member 129 to the beam webs 15, the flange ends 146 of each beam are relieved or bevelled outwardly from the beam web 15 (as appears in FIGS. 1 and 6) to afford clearance with member 129. Thus, force transferring contact between member 129 (which is subject to bending stress in chain testing) and the beam flanges, particularly the end portion thereof at the inner sides of the frame beams, is thereby avoided.

Returning now to the chain mount structure 81 including carriage 100 on rails 81 and 82, the carriage is provided to receive a transducer unit 150 which in the present example, is an electrical strain gauge type load cell of known construction, provided with an axial threaded bore 151 in its rear or base end 152, and a like axial threaded bore 154 in its forward end 155 (see FIG. 6). The cell is selected as to capacity, to accommodate the maximum chain stressing capacity of the testing apparatus. For example, in the present embodiment which is suitable for testing relatively heavy chains and the like, the selected load cell may be one having a maximum stress capacity of the order of 100,000 pounds. In mounted condition relative to the carriage, the load cell is centered therein with its base opposed to the carriage rear end wall 105. A coupling member 156 of desired adjustable character and suitably secured on the end of motor piston rod 124, has a threaded end portion 158 which is projected through central opening 108 in carriage wall 105 into threaded reception in the load cell bore 151. The coupling member in threaded connection to the load cell with the body portion 159 of the coupling member bearing against carriage wall 105, thus effects firm clamping of the load cell at its base end, against the carriage wall, and at the same time provides the operative connection between the motor and the load cell and its carriage. Moreover, the coupling member 156 serves together with carriage support means for the other end of the load cell, presently to appear, to center the load cell in the carriage such that the longitudinal axis of the cell coincides with the central longitudinal axis of the apparatus frame structure.

The load cell thus clamped to the rear wall 105 of the carriage, has its forward end 155 adjacently opposed to the opening 106 in the carriage forward end wall 104. Carried by the cell at its end 155, is a bracket member 160 of generally rectangular, centrally open form having a shank portion 162 terminating in a threaded end centered on the longitudinal axis of the bracket. The bracket shank 162 is received through the carriage wall opening 106 with appreciable clearance therein, with its end 163 threadedly engaged in the load cell bore 154, the bracket thus extending forwardly of the carriage. Carriage support of the load cell at its forward end 155, is here effected through the shank portion 162 of the bracket. A strap 164 (FIG. 9) in the form of a sheet or plate element of flexible character, is apertured at 165 in its lower end portion 166 to receive and embrace the bracket shank in its reduced diameter portion 167 which forms a shoulder 168. The strap is retained in place by suitable holding or clamping collars 169 between the central forward end portion 170 of the cell and the shoulder 168 on the bracket shank 162, the collars securely holding the strap upon shank assembly to the load cell. Strap 164 is in pivotal or swingable suspension from the top 171 of carriage wall 104, through a mounting bar 172 (FIG. 9) having the upper turned end portion 174 of the strap bearing thereon and clamped to the bar by the nuts 175 on a pair of vertical bolts 176, the bolts being threaded through the bar near the ends thereof and bearing upon the surface of wall top 171. The bolts 176 afford positional adjustment control of the bar 172, as by turning one or both bolts in one or the other direction, the bar may be leveled as well as elevated or lowered relative to the top 171 of the carriage wall 104. In this way, the position of the strap 164 may be readily adjusted for positional adjustment of the load cell at its forward end, such as to attain in cooperation with the cell connection to the piston rod 124 as before described, accurate carriage disposition of the load cell to have its longitudinal axis coincident with the longitudinal frame axis 16. The strap 164 serves a further purpose, in that because of its pliability and pivotal or swinging suspension on the carriage, it allows axial movements or displacements of the cell end 155 relative to the carriage, as such normally occur with cell elongation and contraction (generally in minute extent) consequent, respectively, to stressing and unstressing of the cell.

Suitable means may be associated with the strap support bar 172 for retaining the same against displacement from its proper position on the carriage wall. In the present example, such means may include a guard rail 178 as illustrated, suitably bolted to the outer side of the carriage end wall 104 and projecting adjacent one side of the bar 172.

With further reference now to the load cell carried bracket 160 (see FIGS. 6 and 12), the forward end 180 of the rectangular bracket body provides a seat-forming recess 181 having a semi-circular bottom wall 182 the axis of which is in the horizontal direction of the bracket. The recess is upwardly open at 184, and is open at 185 to the centrally open bracket body and at 186 to the forward or outer surface 187 of the bracket end 180. Recess 181 is located such that in the load cell mounted position of the bracket, the axis of the recess bottom wall 182 will coincide with the frame axis 16 of the apparatus. Removably carried by the bracket is a chain support 188 providing a chain link receiving hook portion 189 and a cylindrical shank portion 190 of a diameter for close reception in the bracket recess 181 in seated position on the recess bottom wall 182. The end of the shank opposite hook 189 terminates in a flange-like head 192 which in the bracket mounted position of the member 188, bears against the inner side 193 of the bracket end 180, marginally of the recess 181. Thus, the hook 189 is centered relative to the longitudinal frame axis 16 and so, in alignment with the jaw opening 34 and coupling pin 30 of the chain mount structure 19 hereinbefore described. Obviously, the hook 189 may be replaced by any suitable connector or adapter (not shown) to accommodate a cable, rope or other member to be tested. In order to retain the support 188 against turning, the head 192 in the recess seated condition of the support has each lower corner portion 194 thereof closely overlying a stop projection 195 internally of the member 160.

In operation of the chain test apparatus and given (for example) a chain specimen 197 (FIG. 1) for test, the chain mount 19 is located at a selected one of its stations along the beams 10 and 11 (effected in the manner hereinbefore fully described). Then, the hydraulic motor 120 is actuated to cause slide displacement of the carriage 100 forwardly on rails 81–82 in the direction of mount 19, as to a position near the forward ends of the rails as shown in FIG. 1. Whereupon the chain 197 to be tested, is arranged in supported extension between the load cell hook 189 and the pin 30 of mount 19, ready for reverse actuation of the motor to place the chain under test stress. The fluid pressure supply and control system associated with motor 120, may be of well known type suitable to the character of motor actuation control desired for the present apparatus. Therefore and since the system employed is not, per se, a part of the present invention, it is shown in block form only. Thus, the unit 200 represents a pump system supplied with fluid, as oil, from a sump indicated at 201, and connected to the opposite ends of motor cylinder 121 through pipes 202 and 204. The system unit 200 includes necessary valving and valve controls for effecting oil pressure delivery to either end of the motor cylinder to produce piston movements in the desired direction.

Now with the chain in place and ready for test stressing, the hydraulic motor 120 is energized through control unit 200 such as to effect displacement of piston rod 124 toward the rear or left hand end (FIG. 1) of the cylinder. This produces through the piston rod 124, displacement of the carriage 100 slidably along rails 81—82 toward the left end of the frame, thereby placing the chain under tension stress between the support 19 and the hook support 189 carried by the load cell 150 through bracket 160. Under tension stress conditions, the chain will appear in extension along the longitudinal axis 16 of the apparatus frame. The load cell, being one of the elements of chain support afforded through carriage 100, thus is subject to the tension stress force in application by motor 120 to the chain under test. When electrically energized, the cell then will accurately reflect the applied force in known manner, as by producing an output signal proportional to the chain stressing force. Therefore, by coupling the load cell with a suitable known electrical translating circuit system, its output signal following the tension stressing of the chain may be indicated and/or recorded in appropriate terms, as in pounds. Such circut system is here represented by unit 205 as shown in block form, having circuit connection with the load cell 150 over flexible cable 206 (to be further referred to hereinafter), an supplied with electrical power over power leads 208 including switch 209.

While the fluid pressure supply and control unit 200 of the hydraulic motor 120 may be entirely manually controlled, it is desirable to adapt the unit for cut-off or stoppage of the motor in its chain stressing force applying operation, automatically at any pre-selected point in the chain stressing range of the apparatus. Since control provisions suitable for such purpose, are well known in the art, it is deemed unnecessary to illustrate any particular form or details thereof. Nevertheless, it may be indicated here that the hydraulic motor control unit 200 may include electrically operated cut-off valve means having circuit connection over cable 210 with a suitable control in the load cell circuit system unit 205, wherein such control is operationally responsive to the load cell output signal and settable selectively (as by a manual setting control 212 of unit 205) for response at any selected chain stressing force value, within the capacity of the apparatus, to cause oil pressure delivery cut-off operation of such valve means.

As hereinbefore noted, the presently improved testing apparatus is particularly suitable for the stressing of comparatively heavy or large capacity chains and the like. However, it may be utilized for testing small capacity chains, as those having load capacities less than 10,000 pounds, merely by introducing a correspondingly smaller capacity load cell. The load cell 150 mounted on carriage structure 100, is of 100,000 pound capacity as previously indicated, and so is entirely effective for activating indicator and recording mechanism in the test stressing of heavy chains up to 100,000 pounds stress loading. As is well known in the art of strain gauge type load cell, resolution sensitivity of such large capacity load cells as the cell 150, is very low under cell loading in the lower range of its capacity, which introduces certain difficulties in the response of indicator mechanism. Therefore, in instances of test apparatus use for subjecting small chains and the like to test loading below or up to say 10,000 pounds, the disadvantage of the large load cell is met in the following manner which avoids any necessity for structural removal of the large load cell 150.

The bracket 160 carried by load cell 150, has the heretofore described seat recess 181 dimensioned, particularly as to the radius of the semi-circular bottom wall 182, to accommodate and closely seat therein a small capacity (as a 10,000 pound capacity) load cell unit 215, such unit being illustrated in FIG. 13. The cell unit 215 which is substituted for the chain support 188 (shown in FIG. 6 seated in the recess), carries a chain hook 216 (or an adapter, not shown) at its forward end, and a mounting flange member 217 (like the flange 192 on unit 188) at its rear end. In cell seating in the bracket recess, the cell flange 217 bears against the inner side 193 of the bracket end 180, marginally of the recess 181. Upon bracket mounting of the small cell, its circuit cable 218 (to be further referred to hereinafter) is then introduced in the indicator unit circuit extending to the indicator and recorder unit 205, in place of the cable 206 of large cell 150 as by suitable switching means (not shown) in the unit. Thus, with circuit calibration of the unit 205 as provided for therein to adapt the same to the smaller load cell, the apparatus is then conditioned for testing of small capacity chains and the like. In this case, the large cell 150 remains as a structural link between the chain under test and the hydraulic motor 120. Obviously, apparatus adaptation for heavy chain testing is accomplished simply by reconnecting the large cell 206 in the circuit of unit 205, following open-circuiting of the small cell cable 218; removing the small cell from bracket seat 181; re-inserting the chain support 188 in bracket seat 181, and then re-calibrating the unit 205 to accommodate the large load cell.

As shown particularly in FIGS. 7 and 8, suitable provision is here made to keep the load cell cable connections clear of the moving parts of the apparatus. As an example thereof, a standard 220 is mounted on the upper flange of beam 10 in a position preferably centered with respect to the length of the rails 81—82 along which the carriage 100 is movable. At its upper end the standard supports a swingable arm 221, movable in an arcuate path over the carriage 100. The flexible cable 206 of load cell 150 extends to support on the free end of swinging arm 221, as by a cable clip 222, and is continued therefrom to and through a cable mounting channel member 224 suitably fixed on the upper flange of beam 10 (FIG. 7). Similarly, the cable 218 of small load cell 215 is carried on arm 221 by clip 225, and extends to and through the channel 224. To accommodate the small load cell unit 215 when not in use in bracket 160, a saddle 226 is carried on the beam flange adjacent the standard 220 (FIG. 8). Thus when not in use, the small load cell unit is simply placed in the saddle, as shown in FIG. 8, where it is out of the way yet readily available for use when desired. The cables 206 and 218 are extended, of course, to the indicator and recorder unit 205 for selective connection thereto, as before indicated.

In the now described and illustrated embodiment of the present invention, the chain testing apparatus is of improved construction wherein the operating elements thereof are advantageously centered on the longitudinal center axis of the mian frame, and wherein reaction forces consequent to chain test loading, are transferred to the central web portions of the frame beams, in direct longitudinal application thereto such as to avoid or reduce to negligible amount, force components tending to produce lateral distortion or bending of the beams. Among other advantages possessed by the present improved apparatus, is the adaptability thereof for stress indication and recording in the testing of both large and small capacity chains, such adaptability appearing particularly in the hereindescribed manner of selective employment of electrical load cell type transducers in the stress applying linkage to the chain under test.

It is to be understood that the foregoing description and illustrations herein, relate only to an exemplary embodiment of the present invention, and that such embodiment is susceptible to many modifications and alterations of parts thereof without departing from the spirit and scope of the invention as hereinafter claimed.

What is claimed is:

1. In apparatus for test stressing chains and the like, a frame, a pair of support means for receiving and supporting a chain in extension therebetween, means mounting one of said support means on the frame, a trackway on said frame, motor means providing a rectilinearly movable element, a carriage on and movable along said trackway, load cell means having the other of said support means secured to one end of the load cell means, means connecting the load cell means at its other end, to said movable element on the motor means and to said carriage, and mounting means between the carriage and said one end of the load cell means permitting movement of said one end relative to the carriage.

2. In apparatus for test stressing chains and the like, an elongate frame, a pair of support members for receiving and supporting a chain in extension therebetween, means mounting one of said support members in selected fixed position inwardly of one end of the frame, a trackway on the frame, motor means having an operating element movable lengthwise of said trackway, a carriage on and movable along said trackway, load cell means having the other of said support members mounted on one end of the load cell means, means connecting the load cell means at its other end, to said operating element and the carriage, and mounting means being suspended from the carriage and connected to said one end of said load cell means for permitting movement of said one end of the load cell means relative to the carriage.

3. In apparatus for test stressing chains and the like, a frame providing spaced parallel rigid members, first chain support means in selected fixed position between said members near one end thereof, rails on the members forming a trackway therealong from the opposite end of the members, motor means secured to said members and having an operating element movable lengthwise of said trackway, a carriage movably supported on said trackway rails, said carriage including a wall extending between and normal to said rails, a load cell member, a bracket secured to one end of the load cell member, second chain support means carried by said bracket, means connecting said operating element to the opposite end of the load cell member and clamping the load cell member at said opposite end thereof, to said wall of the carriage, and load cell mounting means between the carriage and said one end of the load cell member disposing the latter and said bracket to locate said second chain support means in alignment longitudinally of the frame members with said first chain support means, said mounting means being adapted for permitting movement of said one end of the load cell member in the axial direction of the latter member.

4. In apparatus for test stressing chains and the like, a frame including a pair of rigid beams each of H-form in transverse section, providing opposite flanges and a central flange-connecting web along the beam length, the beams being in parallel, spaced-apart positions with the webs thereof in facing relation, first chain support means between said beams and connected to the beam webs in selected position inwardly from one end of the frame, means forming a trackway extending parallel with said beams inwardly from the opposite end of the frame, second chain support means movable on said trackway, motor means having an operating element operable for causing movement of said second chain support means in chain test stressing, a load cell interposed between said motor means and said second support means, and a mounting member supporting said motor means and spanning the beams at said opposite end of the frame, said mounting member engaging the ends of the beams at said opposite end of the frame in end-wise bearing against the beam webs, whereby the stress reaction of the motor means in chain test stressing is transferred through the mounting member to the beam webs.

5. In apparatus for test stressing chains and the like, a frame including a pair of rigid beams in parallel spaced-apart relation, means connected to the beams in selected position inwardly from one end of the frame providing a chain support on the longitudinal center axis of the frame between the beams, a pair of rails longitudinally paralleling said beams therebetween and each secured to one of the beams, said rails having corresponding end portions thereof projecting outwardly beyond the beam ends at the opposite end of the frame, motor means providing a rectilinearly movable operating rod, a rigid mounting member supporting said motor means and extending transversely of the beams to abutment with said beam ends, said mounting member having motor position indexing apertures receiving the projecting end portions of the rails to position the member for locating the motor means such as to have the longitudinal axis of its operating rod substantially in alignment with the longitudinal center axis of the frame, and means movably carried on said rails and connected to said operating rod, a chain support carried by said movably carried means and positioned on the longitudinal center axis of said frame, and a load cell connecting said operating rod to said chain support to provide an indication of the stress applied to the test chain.

References Cited in the file of this patent
UNITED STATES PATENTS

| | | |
|---|---|---|
| 1,865,070 | Amsler | June 28, 1932 |
| 1,955,581 | Gates | Apr. 17, 1934 |
| 2,824,446 | Stutzer | Feb. 25, 1958 |